United States Patent [19]

Betts

[11] 4,068,591
[45] Jan. 17, 1978

[54] IGNITION SYSTEM USED IN TESTING SOLID PROPELLANT COMPOSITIONS FOR SMOKELESSNESS

[75] Inventor: Robert E. Betts, Huntsville, Ala.

[73] Assignee: The United States of America as represented by the Secretary of the Army, Washington, D.C.

[21] Appl. No.: 665,490

[22] Filed: Mar. 10, 1976

[51] Int. Cl.² .............................................. C06D 5/00
[52] U.S. Cl. .............................. 102/70 R; 60/39.82 E; 60/256
[58] Field of Search ................... 102/49.7, 70, 70.2 A; 149/108.6, 111; 60/39.82 R, 39.82 E, 256

[56] References Cited

U.S. PATENT DOCUMENTS

| | | | |
|---|---|---|---|
| 1,455,309 | 5/1923 | Strane | 149/111 |
| 2,479,470 | 8/1949 | Carr | 60/256 |
| 2,561,670 | 7/1951 | Miller et al. | 102/70.2 A |
| 3,750,581 | 8/1973 | Betts et al. | 102/49.7 |

OTHER PUBLICATIONS

Ohart; T. C., Elements of Ammunition, N.Y., John Wiley & Sons, Inc., 1946, p. 27.

*Primary Examiner*—Verlin R. Pendegrass
*Attorney, Agent, or Firm*—Nathan Edelberg; Robert P. Gibson; Hugh P. Nicholson

[57] ABSTRACT

This invention is an igniter for solid rocket propellants that is used when testing propellant compositions for smokiness. The igniter has a charge of solid propellant in the form of small, generally spherical particles or thin sheets so as to have a large total burning surface and thin web. The composition of the igniter propellant is same or similar to that of the propellant being tested so that true smokiness of the test propellant can be ascertained. Upon ignition, the igniter propellant charge burns rapidly in an igniter combustion chamber and produces a high internal pressure. The hot gases produced by this combustion of the igniter propellant discharge through an orifice in an igniter chamber wall and flow onto the surface of the main propellant being ignited.

1 Claim, 4 Drawing Figures

IGNITION SYSTEM USED IN TESTING SOLID PROPELLANT COMPOSITIONS FOR SMOKELESSNESS

DEDICATORY CLAUSE

The invention described herein may be manufactured, used, and licensed by or for the Government for governmental purposes without the payment to me of any royalties thereon.

BACKGROUND OF THE INVENTION

This invention relates generally to igniting solid propellants and more specifically to igniting the propellants in a way that reduces the alteration of the composition of the propellant combustion products by the combustion products from the ignition device.

One method of investigating the smokiness of a solid propellant formulation is to load a small rocket motor with the propellant being investigated, static fire the motor in an environmentally controlled chamber, and observe the combustion products that are exhausted from the motor. If the observation is to produce an accurate evaluation, the propellant must be ignited in a way so that the ignition device will not add smoke to the propellant combustion products. Mixtures of powdered metals and pulverized oxidizers which have been commonly used to ignite propellants being tested for smokiness have combustion products containing particulate salts which appear as smoke. These salts can interfere with evaluations made on a propellant even though the weight ration of ignition material to the propellant in a motor is only 1 or 2%. There is therefore a need to ignite charges of propellant being evaluated for smokiness by a means other than the common ignition materials. This need led to the present invention which ignites solid propellants without adding smoke contaminants to the combustion products of the propellants.

The invented igniter differs from a conventional pyrogen type igniter in that a pyrogen has a propellant charge of specific physical dimensions. The propellant in this invented igniter has no specific physical dimensions but rather is finely divided sperical particles or sheet fragments in order to achieve much larger burning surfaces and shorter burning times than are found in pyrogen type igniters.

SUMMARY OF THE INVENTION

The object of this invention is to provide a system for igniting solid propellants so that composition of the combustion products of the propellant (hereafter called the main propellant) will not be appreciably altered by combustion products of the ignition device. This is achieved by using an igniter which comprises small spherical particles and/or thin sheets of solid propellant (hereafter called the igniter propellant) placed in the combustion chamber of a casing which is capable of withstanding high internal pressure. The igniter casing has an orifice which allows controlled escape of the hot, high pressured internal gases which result when the igniter propellant is combusted. The main propellant is ignited by these hot gases from the igniter impinging on the exposed surfaces of the main propellant. The igniter propellant can be of any composition, but the preference is for it to be of the same composition as the main propellant so that the combustion products of the two will more nearly approach an identical composition.

Actual applications of this invention in laboratory testing to determine smokiness of solid propellant compositions have proven it to be highly successful in meeting the objectives of the invention.

DESCRIPTION OF THE PREFERRED EMBODIMENTS

Figure 1:
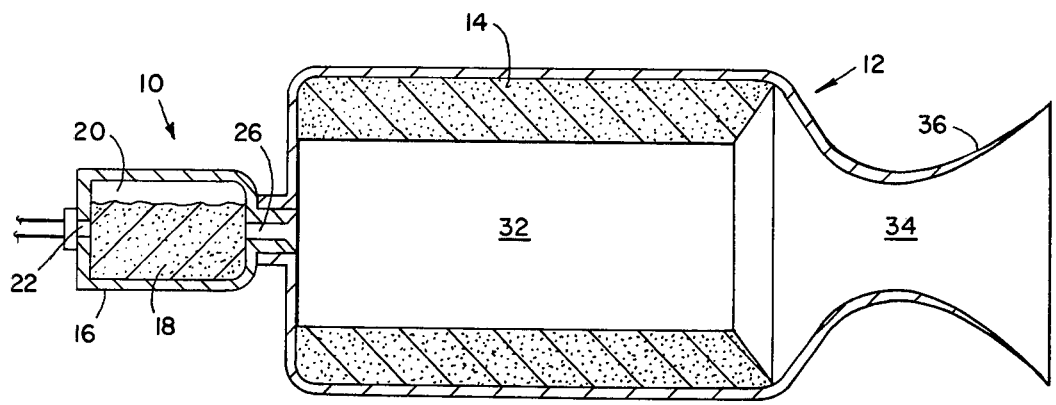
FIG. 1 is a sectional view in accordance with this invention illustrating an igniter attached to a rocket motor.

Referring to the drawing, FIG. 1 shows an igniter 10 attached to a rocket motor 12, the motor being loaded with a main propellant charge 14 which is to be ignited. The igniter has a casing 16 with detached sperical particles and/or thin sheets of igniter propellant 18 in combustion chamber 20, the chamber being formed by the walls of the casing. Combustion of the igniter propellant is initiated by one of various means 22. The igniter propellant burns at a rapid rate and produces a high pressure in the combustion chamber and combustion products of the igniter propellant flow through igniter orifice 26 onto main propellant 14 for ignition. Igniting the main propellant is synonymous to igniting the rocket motor which contains the main propellant.

Two types of solid propellant have been used in this igniter. One is a composite propellant which comprises a granular inorganic salt oxidizer dispersed and suspended in an organic binder fuel. The other type is a double-base propellant which consists primarily of nitrocellulose and nitroglycerin. A composite double-base propellant which consists of a combination of the above two types could also be used in the igniter.

By using an igniter propellant of the same composition as the main propellant, the combustion products of the main propellant are not appreciably altered in composition by the combustion products of the igniter propellant. This phenomenon has proven to be very useful when the main propellant is combusted for the purpose of observing its combustion products for smokiness. This technique would also prove useful when testing the combustion products of the main propellant for infrared radiation or other exhaust plume phenomenon.

Figure 2:
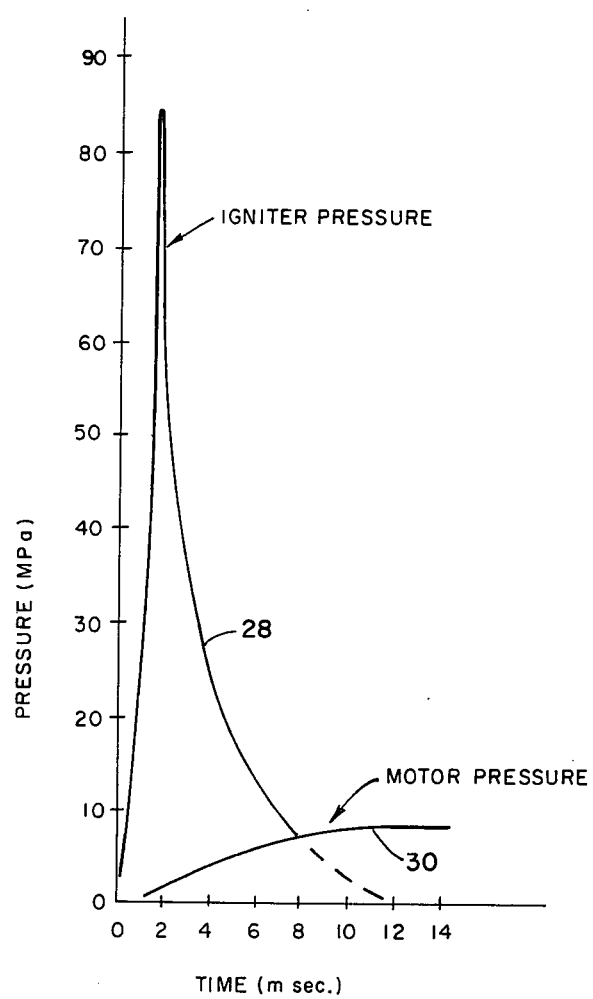
FIG. 2 illustrates pressure/time traces during ignition of an igniter and of a rocket motor in accordance with this invention.

Igniter pressure and burning time as shown in the pressure/time trace 28 of FIG. 2 is obtained by using sperical particles or sheets of igniter propellant that has an aggerate burning web thickness of 0.03 cm or less, with the preferred thickness being around 0.0015 cm. There does not appear to be any upper limit that the surface area that an igniter propellant can be. Igniter propellants with surface areas that result in combustion within 10 msecs give satisfactory ignition of a main propellant.

The igniter propellant for this igniter has been successfully produced by grinding cured solid propellant into small particles and also by shaving thin slivers from a mass of cured propellant. Another way to produce the igniter propellant is to calender uncured propellant into thin sheets, cure the sheets, and then break or cut the sheets into small pieces.

Three separate means 22 are presented for initiating combustion of the igniter propellant: a squib, a hot wire, and a laser beam. The squib initiator has been used very successfully. The squib has a slight disadvantage when used in smokiness tests in that its pyrotechnic materials give off some smoke upon combustion. However, the amount of smoke from a squib is so small in comparision to the total amount of combustion products from the main propellant being tested that in almost all instances it does not interfere with the observations for smoke made on the propellant combustion products. The ratio of squib combustion products to propellant combustion products is less than 0.02%. If a squib or other charged conventional igniter material were large enough to ignite the main propellant directly without the aid of the intermediate combustion products produced by this igniter, the amount of smoke produced would be of sufficient quantity to interfer with the results of the test.

A hot wire embedded in the igniter propellant and heated to the ignition temperature of the igniter propellant by means of an electrical current can satisfactorily initiate the combustion of the igniter propellant and would not produce any smoke. A laser beam which enters the igniter chamber through a transparent window in the igniter casing and shines against the igniter propellant can give equally satisfactory, non-smoke producing initiation of combustion.

A successful ignition of the main propellant in a rocket motor is characterized by a rapid rise of pressure within the motor chamber 32 to the pressure at which the motor is designed to initially operate, and a sustained continuation of this pressure in the chamber due to combustion of the main propellant. This is illustrated by pressure/time trace 30 of FIG. 2. With the present invention, the initial pressurization in the motor chamber is caused by hot gases from the igniter. Once the main propellant starts to burn, the pressure within the motor chamber will be the product of the igniter gases and those from the main propellant. The pressure will continue to be a product of these two sources until the pressure in the igniter chamber drops to that of the motor chamber. From there on, the pressure within the motor chamber will be produced solely by the combustion of the main propellant. Referring again to FIG. 2, pressure/time trace 28 shows the igniter propellant combusted (i.e. reach maximum pressure) within 2 msecs. Pressure/time trace 30 shows that the motor reaches its initial operating pressure of 7.5 MPa in 10 msecs and that the motor pressure remains constant for initial motor operation after 10 msecs. This indicates a successful ignition of the motor.

It is obvious from the above that it is necessary for the pressure within the igniter chamber to be much greater than the initial operating pressure in the motor chamber if the combustion products from the igniter propellant are to quickly bring the pressure in the motor chamber up to the initial operating pressure. A second reason that it is desirable for the pressure within the igniter chamber to be high is because fast combustion of the igniter propellant is desirable, and the combustion rate for propellants increase with an increase in pressure.

The preferred igniter for any particular application is determined by the characteristics of the rocket motor to be ignited. Referring back to FIG. 1, major considerations for making an igniter are: the physical configuration of the main propellant 14 in the rocket motor, the composition of the main propellant, the amount of free volume in the motor chamber 32, and the area of the opening 34 in the motor nozzle 36. In motors that are static fired to test the composition of propellants, all of these factors will normally be held relatively constant for tests of smokiness except for the composition of the main propellant. The composition therefore becomes the chief factor to be considered in designing the igniters used in the tests.

Figure 3:
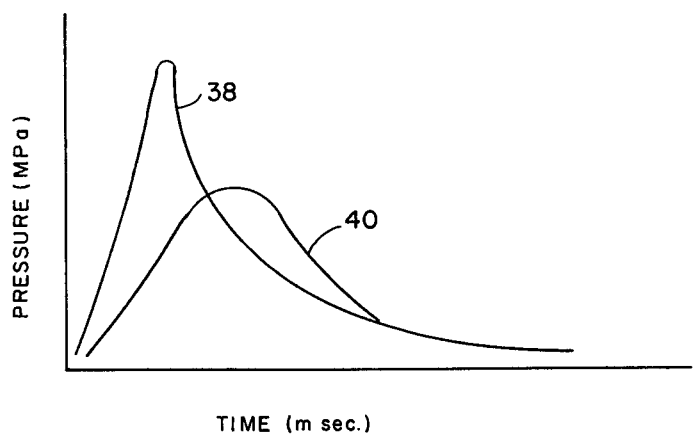
FIG. 3 illustrates pressure/time traces during the combustion of igniters in accordance with this invention which show the variations that can be achieved by altering the ratio of igniter propellant to combustion chamber volume.

Ignition characteristics can vary considerably from one propellant composition to another. Therefore, successful ignition of different compositions may require variations in the total amount of hot gases from the igniter and in the duration of time that these gases flow across the surfaces of the main propellant. The rate of discharge of the gases from the igniter chamber can be altered by changing the pressure within the igniter chamber. This pressure can be changed by varying the ratio of mass of igniter propellant to the volume of the igniter chamber. A high mass to volume ratio results in a high pressure and fast discharge as illustrated in FIG. 3, pressure time trace 38. A lower mass to volume ratio results in a lower pressure and slower discharge as illustrated in FIG. 3 pressure/time trace 40.

Figure 4:
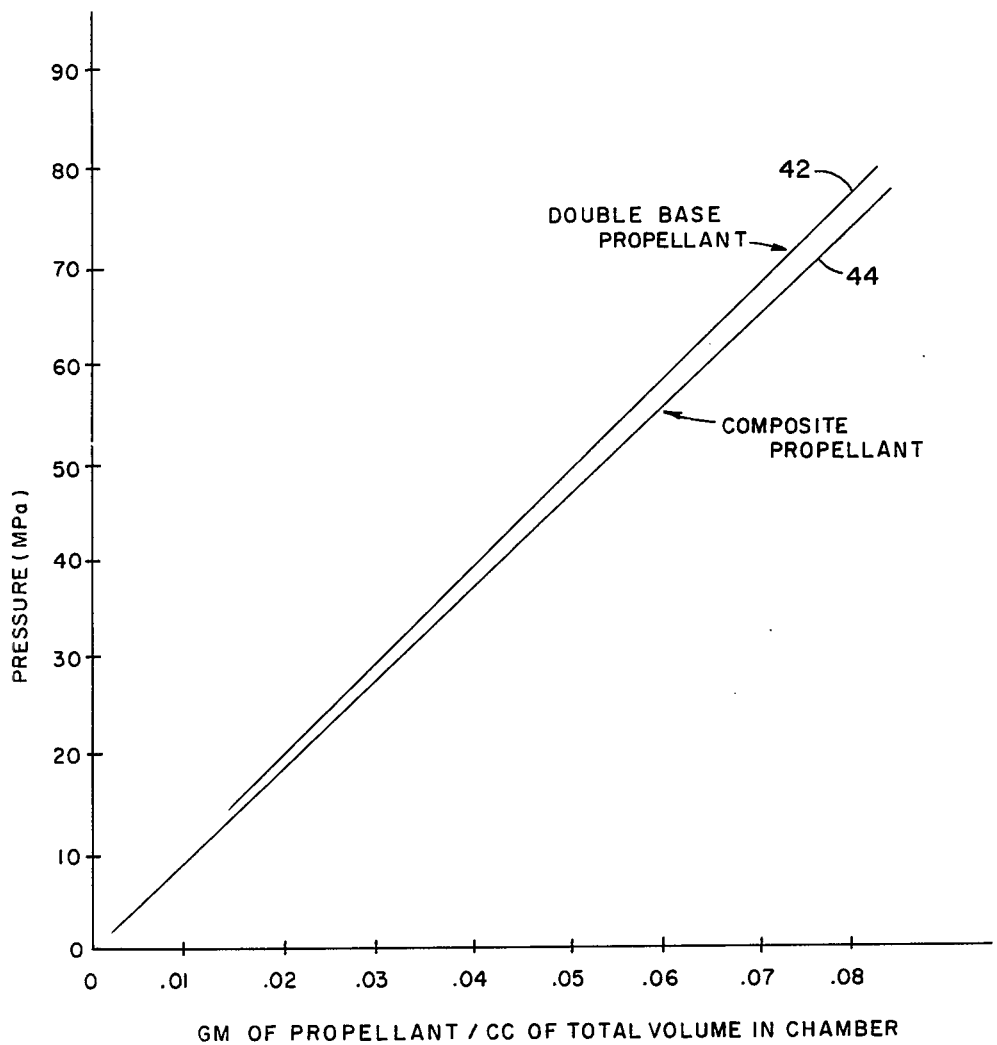
FIG. 4 illustrates traces of pressure/ratio of igniter propellant mass to free volume for composite and double based propellant combusted in a closed bomb.

Since the opening in the igniter orifice is small and the combustion of the igniter propellant is rapid, pressure that will be produced within the igniter chamber can be approximated by combustion pressure produced in a closed bomb. FIG. 4 shows the expected relationship between pressure and igniter loading density for both double-base 42 and composite propellants 44 combusted in a closed bomb.

Below are typical values for igniter/motor parameters that have a major effect on the ignition of the main propellant in the rocket motor.

|  | Igniter A | Motor A | Igniter B | Motor B |
|---|---|---|---|---|
| Propellant | Double-Base | Double-Base | Composite | Composite |
| Free Volume | 18.3 cc | 115 cc | 18.3 cc | 115 cc |
| Charge Weight | 0.9 gm | 60 gm | 1.2 gm | 60 gm |
| Throat Opening | 3.75 mm² | 18.3 mm² | 3.75 mm² | 21.3 mm² |
| Initial Maximum Pressure | 49 MPa | 8.3 MPa | 61 MPa | 9.6 MPa |

The pressure produced in the motor chamber due to the combustion products from the igniter, (excluding the combustion products from the main propellant) can be approximated by:

$$P_m = (A_{ti}/A_{tm}) \cdot P_i.$$

Explanation of terms and symbols used:

Free volume-igniter: The total volume of the igniter combustion chamber without regard for the volume of the igniter propellant.

Free volume-motor: The total volume within the motor chamber less the volume displaced by the main propellant.

$P_m$: Pressure produced in the motor chamber due primarily to the combustion products from the igniter.

$P_i$: pressure produced in the igniter combustion chamber.

$A_{tm}$: Throat area of the motor nozzle.

$A_{ti}$: Throat area of the igniter orifice.

cc: cubic centimeter.

cm: centimeter gm: gram msec: millisecond

MPa: mega Pascal.

mm: millimeter.

I claim:

1. In an igniter for igniting a main solid propellant charge being tested for smokelessness, said igniter including in combination a casing having an inner combustion chamber and an orifice, an ignition material in said chamber, and means for initiating combustion of said ignition material whereby said ignition material combusts and combustion products from said ignition material flow from said chamber through said orifice onto and thereby igniting said main solid propellant charge, the improvement comprising: said ignition material being of the same composition as said main solid propellant charge selected from propellant types consisting of composite and double base propellant, said ignition material having a weight ratio of about 0.9–1.2 grams to a main solid propellant charge weight of about 60 grams, and said ignition material being detached small pieces of solid propellant having an aggregate burning web thickness of 0.03 cm or less so that said ignition material will combust within 10 msec after said initiation of combustion.

* * * * *